United States Patent Office 2,811,480
Patented Oct. 29, 1957

2,811,480

PHOSPHORTHIOATE COMPOSITIONS AND METHODS FOR CONTROLLING PARASITES ATTACKING ANIMALS

Mark G. Norris, Jr., and Lisby L. Wade, Lake Jackson, Tex., assignors to The Dow Chemical Company, Midland, Mich., a corporation of Delaware No Drawing. Application March 28, 1956,
Serial No. 574,376

15 Claims. (Cl. 167—53)

The present invention relates to animal husbandry and is particularly directed to methods and compositions for controlling parasites attacking warm blooded animals and for improving the growth characteristics of such animals.

Domestic animals are subject to attack by a number of different parasites, including fleas, flies, lice, ticks, screw-worms and cattle grubs as well as the helminthic parasites such as lung worms, stomach worms and gastrointestinal worms. The helminthic parasites include the strongyloids, cooperids and ascarids and are the causative agents of ascariasis, trichostrongylosis and gross parasitism. The helminths grow and mature in various organs but particularly the gastro intestinal tract of their host. In the usual life cycle, the ova pass out of the body with the fecal droppings, hatch and reach their infective stage, whereupon they are ingested during grazing, or as in the case with hookworms, enter the body through the skin. In the case of ascarids, the swallowed eggs or larvae mature usually in the digestive tract. In other cases the maturing process may take place in other parts of the body such as the liver or the lungs as with lungworms.

The parasites during maturation and growth have a very deleterious effect upon the animal and its rate of growth. In the intestine the parasites erode the epithelial tissues bringing about hemorrhage, anemia, weakness and tissue necrosis. Animals, if they do not succumb to gross parasitism are rendered economically unfit by weakness, lowered vitality, and poor growth and reproduction. It is estimated that the losses accruing to the cattle industry of the United States from gross parasitism amount to about fifty million dollars per year, with yearly losses due solely to mortality running as high as nine million dollars.

A particularly undesirable parasite in animals is the cattle grub. This grub is the larval form of the heel fly (*Hypoderma lineatum*), the bomb fly (*Hypoderma bovis*) or the bot fly (*Dermatobia hominis*). The latter fly is found mostly in the Central and South American countries. The heel and bomb flies appear in the United States in July and August and fasten their eggs near the base of the hair on their host. The bot fly is not seasonal in the Central and South American habitat and lays its eggs on an insect such as a mosquito or common fly which carries the eggs to the warm blooded host. Following their attachment, the eggs of the various flies hatch in four or five days and the larvae bore through the skin of the host. The heel fly larvae migrate to the esophageal region or the abdominal viscera while the bomb fly larvae migrate through the spinal canal. During their life in the host, the larvae feed upon host tissue. After from about three to six months, depending upon the climatic conditions, the larvae locate in the skin and particularly the skin on the back of the host. Here, the larva opens a hole through the skin, usually in the choicest part of the hide, and grows rapidly for about six weeks. The larva thereafter leaves the animal through the hole in the skin, falls to the ground and shortly thereafter, depending upon the prevailing temperature, pupates for its transformation to the adult stage. No satisfactory control for such cattle grubs is known. The organisms cause considerable damage to the carcass of beef animals. In infested areas, losses from beef trimmings and prime leather run as high as ten dollars a carcass. Thus, the yearly loss to the cattle industries of the United States runs into the millions of dollars.

It is an object of the present invention to provide a new and improved practice in animal husbandry. A further object is to provide a method for improving the growth characteristics of warm blooded animals. Another object is the provision of an improved method for controlling parasites attacking warm blooded animals. An additional object is the provision of a method wherein a systemic agent is employed for the control of parasites attacking warm blooded animals. A further object is the provision of a method wherein a warm blooded animal is caused to ingest a systemic agent assimilable by the animal to control the parasites attacking the animal. Yet another object is to provide a method for the control of cattle grubs. An additional object is the provision of novel compositions adapted to be employed in the new methods of benefiting animals. Other objects will become apparent from the following specification and claims.

The new practice in animal husbandry comprises dosing warm blooded animals with a systemic agent selected from the group consisting of the O-aryl O-methyl phosphoroamidothioates, O-aryl O-ethyl phosphoroamidothioates, O-aryl O-methyl N-methyl phosphoroamidothioates, O-aryl O-ethyl N-methyl phosphoroamidothioates, O-aryl O-methyl N-ethyl phosphoroamidothioates, O-halophenyl O,O-dimethyl phosphorothioates and O-halophenyl O,O-diethyl phosphorothioates, wherein O-aryl represents O-(4 - methoxyphenyl), O-(4-lower-alkyl-2-chlorophenyl) and O-halophenyl, and O-halophenyl represents O-(monochlorophenyl), O-(2,4-dichlorophenyl), O-(2,5-dichlorophenyl), O-(3,4-dichlorophenyl) and O-(2,4,5-trichlorophenyl). The new practice controls parasites attacking warm blooded animals and improves the growth characteristics of the animals. Further, the compounds as employed in the new method have been found to be assimilable by the warm blooded animal and to control parasites attacking the flesh, viscera or vascular system of the animal. Also, the phosphorus compounds are adapted to be administered to warm blooded animals in amounts sufficient to control attacking parasites without adversely affecting the animals. The term lower alkyl as herein employed refers to the alkyl radicals containing from 1 to 4 carbon atoms, inclusive.

The phosphorus compounds as employed in the present invention may be represented by the following formulae wherein aryl and halophenyl are as defined above.

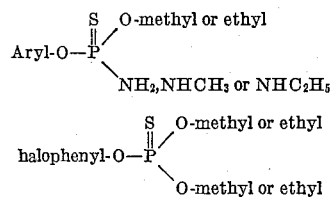

These compounds are viscous liquids or crystalline solids, somewhat soluble in many organic solvents and of very low solubility in water. They are adapted to be readily and conveniently administered to warm blooded animals to benefit the animal and improve its growth characteristics.

The oral administration or feeding of a chemotherapeutic dose, or dose sufficient to control the pathogenic parasites without serious toxic effects upon the warm blooded animal, is essential and critical for the practice of the present invention. The exact dose to be administered to the animal is dependent upon the parasite to be controlled and the phosphorus compound employed, as well as upon whether the administration is to be made in a single dose or in multiple doses over a period of several days. Where a single dose is employed for the control of helminths, good results are obtained when the phosphoroamidothioates are administered at a dosage of from 50 to 150 milligrams per kilogram of body weight of the animal. With the triester phosphorus compounds (halophenyl-OPS=(O-alkyl)$_2$) good controls of these same parasites are obtained at dosages of from 75 to 175 milligrams per kilogram of body weight. For the control of flies, fleas, lice, ticks and screw worms, good results are obtained when the phosphorus compounds are employed at dosages as low as 25 milligrams per kilogram of body weight, while for the control of cattle grubs O-(2,4,5-trichlorophenyl) O,O-dimethyl phosphorothioate, O-(2,4,5-trichlorophenyl) O-methyl N-methyl phosphoroamidothioate and O-(2,4,5-trichlorophenyl) O-methyl N-ethyl phosphoroamidothioate give good controls at dosages of 40 milligrams or more per kilogram of body weight. If desired, the compounds may be administered in multiple doses over a period of several days. In such operations, it is preferred to employ a daily dosage of from 5 to 25 milligrams per kilogram of body weight.

The method of the present invention may be carried out by the oral administration or feeding of the unmodified phosphorus compounds. However, the present invention also embraces the employment of a liquid, drench, powder, mash, pellet or other animal feed composition containing the phosphorus compounds. In such usage, the compounds may be modified with one or a plurality of additaments or innocuous ingestible adjuvants including water, ethanol, skimmed milk, syrups, edible oils or other liquid carriers; surface active dispersing agents such as the liquid and solid emulsifying agents; and edible solid carriers such as edible powders and commercial animal feeds, concentrates and supplements. Such augmented compositions are adapted to be fed animals to supply the desired dose of active agent or to be employed as concentrates and subsequently diluted with additional carrier to produce the ultimate compositions.

The exact concentration of the phosphorus compounds to be employed in the compositions may vary provided that sufficient of the composition is ingested by the animal so as to provide the required dosage of active agent. For example, where direct administration to an individual animal is to be employed, liquid or solid compositions containing from 4 to 95 percent by weight of the agent may be employed to supply the desired dosage. Where the compounds are provided as a constituent of the principal food ration, satisfactory results are obtained with food rations containing a minor but effective amount of the phosphorus compounds. The exact amount of the compound to be incorporated in the ration is dependent upon the food consumption and feeding habits of the animals concerned. In animals such as pigs and mice, the required dosage may be supplied with feed compositions containing from 0.01 to 1 percent by weight of active agent. In fowl, the required dosage may be supplied with mash compositions containing from 0.01 to 0.25 percent by weight of the systemic agents. Where the compound is provided as a constituent of feed supplements, good results are obtained with supplements containing from 0.5 to 5 percent by weight of the phosphorus compounds. In compositions to be employed as concentrates the active agents may be present in a concentration of from 5 to 95 percent by weight.

Liquid compositions containing the desired amount of the phosphorus compounds may be prepared by dissolving the compounds in ethanol or an edible oil, or by dispersing them in water with the aid of a suitable surface active dispersing agent such as an ionic or non-ionic emulsifying agent. Suitable surface active dispersing agents include the glycerol and sorbitan esters of fatty acids, and the polyoxyalkalene derivatives of fatty alcohols and sorbitan esters. The aqueous compositions may contain one or more water miscible oils as a solvent for the active agent. In such compositions the water, oil and emulsifying agent constitute an aqueous emulsion carrier.

In the preparation of solid feed compositions the phosphorus compounds may be mechanically mixed with a finely divided edible solid such as flour or animal feed, or a solid surface active dispersing agent such as finely divided bentonite, fuller's earth or attapulgite. These compositions may be administered in the form of capsules or tablets or dispersed in an animal feed and such feed used to supply a part or the entire ration. Alternatively, the phosphorus compounds may be dissolved in an organic solvent, the resulting mixture dispersed in an animal feed and the feed dried to remove the solvent. Also the compounds may be dispersed in an edible oil such as coconut oil, olive or peanut oil and the resulting mixture dispersed in the feed. These edible oil compositions may contain one of the aforementioned emulsifying materials as a dispersing agent.

Preferred embodiments of the present invention are compositions comprising phenothiazine in combination with the herein described phosphorus compounds such as O-(2,4,5-trichlorophenyl) O,O-dimethyl phosphorothioate. In such compositions the toxicants are mutually activating so that a greater than additive or synergistic result is obtained as regards the control of many helmenthic organisms. The mixture of toxicants thus permits the use of reduced amounts of phosphorus compound and phenothiazine, and the achievement of results superior to those obtainable when either of the constituents is employed separately. The compositions should contain from 0.1 to 1.0 part by weight of phosphorus compound with each part by weight of phenothiazine. These mixtures of toxicants may be administered to the animal or the mixtures modified with ingestible innocuous adjuvants as previously described to produce liquid or solid compositions adapted for use as concentrates or for animal administration. The very desirable and beneficial results are obtained when orally administering chemotherapeutic dosages of the toxicant mixtures. Particularly desirable results are obtained with a mixture comprising O-(2,4,5-trichlorophenyl) O,O-dimethyl phosphorothioate and phenothiazine at dosages of 40 milligrams or more of the phosphorus compound per kilogram of body weight.

Since the cattle grubs, *Hypoderma lineatum* and *bovis*, are seasonal in their appearance, it is preferred that the administration for their control be carried out in the fall and quite soon after the disappearance of the heel and bomb flies. The disappearance of these flies varies somewhat depending upon the climate. For the control of the cattle grub, *Dermatobia hominis*, in the Central and South American countries, it is desirable that the administration be carried out about four times each year. When following such practices good controls of cattle grubs are obtained with a minimum of damage to the animal from the migration of the grub. Further, the grubs are controlled before they have a chance to adversely affect the animal or its rate of growth, or reduce the value of the animal's hide.

The practice of administering O-(2,4,5-trichlorophenyl) O,O-dimethyl phosphorothioate to warm blooded animals and compositions comprising the compounds in admixture with animal feed or with phenothiazine constitute preferred embodiments of the present invention. Such compositions and methods have been found to be of very low toxicity to the warm blooded animal and to give outstanding controls of parasites.

Although the methods and compositions of the present invention and the phosphorus compounds therein employed are useful for the control of a number of parasites in warm blooded animals, such teaching is not to be construed to the end that the methods, compositions and compounds are equivalents for the control of a particular parasite or the life stage of such parasite, or for the control of such parasite or life stage thereof in a particular animal.

The following examples illustrate the invention and are not to be construed as limiting.

Example 1

O-(2,4,5-trichlorophenyl) O,O-dimethyl phosphorothioate, O-(2,4,5-trichlorophenyl) O-methyl N-methyl phosphoroamidothioate and O-(2,4,5-trichlorophenyl) O-methyl N-ethyl phosphoroamidothioate were employed as systemic agents for the control of cattle grubs in yearling calves known to be infested with the larvae of *Hypoderma lineatum*. In such operations, each phosphorothioate compound was orally administered to five calves in the form of an aqueous drench. About ten ounces of aqueous drench was employed per calf to supply a dosage of 100 milligrams of O-(2,4,5-trichlorophenyl) O,O-dimethyl phosphorothioate and 50 milligrams of the other phosphorothioate compounds per kilogram of body weight. A group of ten similarly infested yearling calves was left untreated to serve as checks.

The aqueous drench compositions were prepared from ingestible concentrate compositions containing one of the phosphorus compounds. The concentrate compositions were wettable powders containing 25 parts by weight of phosphorus compound, 44 parts of kaolin clay, 28 parts of diatomaceous earth, two parts of a polymerized sodium salt of a substituted benzoid alkyl sulfonic acid (Daxad Number 27) and one part of sodium napthalene sulfonate (Nekal A). These ingestible concentrate compositions were prepared by mechanically mixing and grinding the indicated constituents together.

At intervals of three, six and nine weeks following the treatments the calves were examined and weighed. The examination showed that the treatments did not have an adverse effect upon the animals or upon their growth rates.

At intervals of 22, 23, 26 and 30 weeks following the treatments the animals were examined for evidence of nodular dermal cysts attributable to and harboring cattle grub larvae. From the examination there was found one cattle grub larva in one of the valves treated with O-(2,4,5-trichlorophenyl) O,O-dimethyl phosphorothioate, and no cattle grub larvae in the cattle treated with O-(2,4,5-trichlorophenyl) O-methyl N-ethyl phosphoroamidothioate and O-(2,4,5-trichlorophenyl) O-methyl N-methyl phosphoroamidothioate. At the time of the observations there was found in the untreated check group an average of ten cattle grub larvae per animal.

Example 2

O-(2,4,5-trichlorophenyl) O,O-dimethyl phosphorothioate was employed as a systemic agent for the control of stable flies (*Stomoxys calcitrans*) feeding upon the skin surfaces of a yearling calf. In such operations, the phosphorothioate compound was orally administered to the calf as an aqueous drench in an amount sufficient to supply a dosage of 200 milligrams of the phosphorothioate compound per kilogram of body weight. The aqueous drench composition was prepared by dispersing in ten ounces of water a quantity of a concentrate composition sufficient to supply the desired dosage. The concentrate employed was that containing the phosphorothioate compound as described in Example 1. Fifteen minutes after the dosing operation, stable flies were allowed to feed upon the back of the calf for a period of 15 minutes and the flies thereafter placed in cages and observed for a period of 24 hours for mortality. As a result of these operations there was obtained a 100 percent kill of the stable flies which fed upon the animal. For the few hours following treatment, the calf exhibited very mild symptoms of toxicity. These symptoms rapidly disappeared and subsequent observation showed that the treatment had no deleterious effect upon the calf.

Example 3

O-(2,4,5-trichlorophenyl) O,O-dimethyl phosphorothioate and O-(2,4,5-trichlorophenyl) O-methyl N-methyl phosphoroamidothioate were employed as systemic agents for the control of stable flies feeding upon the skin surfaces of cows. The compositions employed and the dosing operations were all as described in Example 1 with each phosphorus compound being administered to a yearling calf at a dosage of 50 milligrams per kilogram of body weight.

Fifteen minutes following the dosing operation, stable flies were allowed to feed upon the skin surfaces of the animal for a period of 15 minutes and thereafter caged and observed for 24 hours for mortality. As a result of these operations there was obtained a 95 percent control of stable flies feeding upon the animal which was treated with O-(2,4,5-trichlorophenyl) O,O-dimethyl phosphorothioate and a 100 percent control of stable flies feeding upon the calf which was dosed with O-(2,4,5-trichlorophenyl) O-methyl N-methyl phosphoroamidothioate. Following the treatment no adverse effect upon the calves attributable to the phosphorus compounds was observed.

Example 4

Various of the phosphorus compounds were employed as systemic agents for the control of stable flies feeding upon the skin surfaces of mice. In such operations, the phosphorus compounds were directly introduced into the stomach of the mouse at dosages of 100 and 200 milligrams per kilogram of body weight. One hour following the introduction, the mice were restrained and ten stable flies allowed to feed upon the animal for a period of one hour. The stable flies were thereafter observed for 24 hours for mortality. The results of these operations are set forth in the following table:

| Test Compound | Percent Mortality of the Stable Fly at the Indicated Dosage in Milligrams per Kilogram of Body Weight | |
|---|---|---|
| | 100 mg. | 200 mg. |
| O-(2,4,5-trichlorophenyl) O,O-dimethyl phosphorothioate | 85 | 100 |
| O-(2,4,5-trichlorophenyl) O,O-diethyl phosphorothioate | 70 | 70 |
| O-(2,4-dichlorophenyl) O,O-diethyl phosphorothioate | 93 | 97 |
| O-(2,4,5-trichlorophenyl) O-methyl phosphoroamidothioate | 90 | 90 |
| O-(2,4,5-trichlorophenyl) O-methyl N-methyl phosphoroamidothioate | 60 | 90 |
| O-(2,4,5-trichlorophenyl) O-methyl N-ethyl phosphoroamidothioate | 90 | 90 |
| O-(2,4,5-trichlorophenyl) O-ethyl N-methyl phosphoroamidothioate | 100 | 80 |
| O-(2,5-dichlorophenyl) O-methyl phosphoroamidothioate | 80 | |
| O-(3,4-dichlorophenyl) O-methyl N-methyl phosphoroamidothioate | .80 | 100 |
| O-(3,4-dichlorophenyl) O-methyl phosphoroamidothioate | 100 | 85 |
| O-(4-chlorophenyl) O-methyl N-methyl phosphoroamidothioate | 100 | 95 |
| O-(4-chlorophenyl) O-methyl phosphoroamidothioate | 95 | 100 |
| O-(4-tertiarybutyl-2-chlorophenyl) N-methyl phosphoroamidothioate | 100 | 100 |
| O-(4-tertiarybutyl-2-chlorophenyl) O-methyl phosphoroamidothioate | 60 | 85 |
| O-(4-methoxyphenyl) O-ethyl phosphoroamidothioate | 95 | 100 |

Example 5

Twenty-five parts by weight of O-(2,4,5-trichlorophenyl) O,O-dimethyl phosphorothioate, 39 parts of kaolin clay, 25 parts of diatomaceous earth, 8 parts of citric acid, 2 parts of Daxad No. 27 and 1 part of Nekal A were mechanically mixed and ground together to prepare a concentrate composition in the form of an ingestible wettable powder. One-hundred and twenty grams of this concentrate composition was dispersed in 14 ounces of water and the resulting aqueous composition orally administered to a yearling heifer weighing 303 pounds and known to be infected with lungworm larvae and other helminth parasites. The amount of concentrate employed corresponded to a dosage of 400 milligrams of the phosphorothioate compound per kilogram of body weight. For a period of six days prior to the administration, the calf was found to be voiding an average of 217 ova per gram of feces. These ova included those of *Cooperia sp.* and the stomach and intestinal worms (*Ostertagi sp., Trichostrongylus sp., Haemonchus contortus* and *Esophogostomum sp.*), as well as larvae of lungworm (*Dictyocaulus viviparus*).

During the first three days following treatment, examination of the feces showed that the heifer had voided nearly six thousand stomach and intestinal worms; 765 Haemonchus, 1220 Ostertagia, 2600 Cooperia, 300 Trichostrongulus, 460 Esophogastomum and 630 unidentified worms. Three months following treatment, the heifer was sacrificed and the bronchi examined for lungworm. The examination showed a 100 percent control of lungworms.

The treated heifer exhibited mild symptoms of toxicity for several hours following treatment. These symptoms soon disappeared and subsequent observations showed no deleterious effect upon the animal resulting from the treatment.

*Example 6*

Ninety-seven grams of the wettable powder concentrate composition containing O-(2,4,5-trichlorophenyl) O,O- dimethyl phosphorothioate as described in Example 1 was dispersed in about seven ounces of water and the resulting composition orally administered to a yearling calf. The amount of concentrate employed corresponded to a dosage of 150 milligrams of the phosphorothioate compound per kilogram of body weight of the calf. For a period of six days prior to the administration, the calf was found to be voiding an average of 443 ova per gram of feces. These ova included those of *Cooperia sp.* and the stomach and intestinal worms (*Ostertagi sp., Trichostrongulus sp., Haemonchus contortus* and *Esophogostomum sp.*), as well as larvae of lungworm (*Dictyocaulus viviparus*). The first day following the treatment the calf voided large numbers of nematodes. Examination of the feces upon the second day after treatment showed them to be substantially free of nematode ova. Following the treatment, no adverse effect upon the calf attributable to the phosphorothioate compound was observed.

*Example 7*

A portion of the concentrate composition (43.8 grams) containing O-(2,4,5-trichlorophenyl) O-methyl N-ethyl phosphoroamidothioate as described in Example 5 was dispersed in 16 ounces of water and the resulting composition orally administered to a yearing calf. The amount of concentrate employed corresponded to a dosage of 300 milligrams of the phosphoroamidothioate compound per kilogram of body weight of the calf. For a period of seven days prior to treatment, the calf was found to be voiding an average of 111 ova per gram of feces. These ova included those as described in the preceding example. The first few days after treatment the calf voided numerous nematodes. Seven days after treatment, the feces were examined and found to be substantially free of nematode ova.

Symptoms of toxicity were observed in the calf for several hours following treatment. Subsequent observations showed no deleterious effect upon the animal attributable to the treatment with the phosphoroamidothioate compound.

*Example 8*

O-(2,4,5-trichlorophenyl) O-ethyl N-methyl phosphoroamidothioate was compounded as described in Example 1 to prepare an ingestible wettable powder concentrate. A portion of this concentrate (29.5 grams) was dispersed in about ten ounces of water, and the resulting composition orally administered to a yearling calf. The amount of concentrate employed corresponded to a dosage of 50 milligrams of the phosphoroamidothioate compound per kilogram of body weight of the calf. During a period of six days prior to the administration, the calf was found to be voiding an average of 450 nematode ova per gram of feces. The ova included those as described in Example 6. During the first two days following treatment, the calf voided a large number of nematodes. Eight days after treatment, examination of the feces showed an 89 percent reduction in the number of nematode ova being voided. No deleterious effect upon the animal attributable to the treatment was observed.

*Example 9*

A portion of the concentrate composition as described in Example 5 was dispersed in a grain ration to produce an animal feed containing 3.3 grams of O-(2,4,5-trichlorophenyl) O,O-dimethyl phosphorothioate per six pounds of feed. This composition was fed for a period of seven days to a yearling calf weighing 297 pounds in an amount corresponding to 25 milligrams of phosphorothioate compound per kilogram of body weight. During a period of four days prior to the administration, the calf was found to be voiding an average of 623 nematode ova per gram of feces. The ova included those as described in Example 6. During the first three days following treatment the calf voided a large number of nematodes. Seventeen days following treatment, examination of the feces showed a 91 percent reduction in the number of voided nematode eggs. No deleterious effect upon the animal attributable to the treatment was observed.

*Example 10*

A portion of the concentrate composition containing O-(2,4,5-trichlorophenyl) O,O-dimethyl phosphorothioate as described in Example 1 was dispersed in ten ounces of water and the resulting composition orally administered to a cow having a heavy infestation of the short nosed cattle louse, *Haematopenus eurysternus*. Thousands of lice were to be found upon the cow, the skin along the side of the neck and brisket having been denuded of hair by the parasite. The amount of the concentrate composition employed was sufficient to supply 125 milligrams of O-(2,4,5-trichlorophenyl) O,O-dimethyl phosphorothioate per kilogram of body weight of the cow. Examination of the skin surfaces of the cow at the end of 48 and 72 hours following treatment showed a 100 percent kill of the short nosed cattle louse. No adverse effect upon the cow attributable to the phosphorothioate compound was observed following treatment.

At the end of 4, 24 and 48 hours following the treatment, stable flies were allowed to feed upon the back of the cow for a period of 15 minutes and thereafter placed in cages and observed for a period of 24 hours for mortality. From the observations there was found a 97 percent kill of flies allowed to feed upon the cow four hours following treatment and a 93 percent control of flies allowed to feed upon the cow at periods of 24 and 48 hours following treatment.

*Example 11*

A portion of the concentrate composition containing O-(2,4,5-trichlorophenyl) O-methyl N-methyl phosphoroamidothioate as described in Example 1 was dispersed in ten ounces of water and the resulting composition orally administered to a yearling calf weighing 534 pounds. The amount of the concentrate composition employed was sufficient to supply 50 milligrams of the phosphoroamidothioate compound per kilogram of body weight of the calf.

Twenty-four hours following treatment, stable flies were allowed to feed upon the back of the cow for a period of fifteen minutes and thereafter placed in cages and observed for a period of 24 hours for mortality. From the observations there was found a 100 percent kill of flies.

Example 12

O-(2,4,5-trichlorophenyl) O-methyl phosphoroamidothioate was compounded as described in Example 1 to prepare an ingestible wettable powder concentrate. Thirty-nine grams of this concentrate were dispersed in about 10 ounces of water and orally administered to a Brahman heifer weighing 430 pounds. The amount of concentrate employed corresponded to a dosage of 50 milligrams of the phosphoroamidothioate per kilogram of body weight of the calf. The calf had been dehorned and had a heavy infestation of screw worms (*Callitroga americana*) in the areas surrounding the sites of dehorning. Twenty-four hours following the administration, the wounds were examined and found to be free of screw worms. Examination of the wounds at the end of four days and seven days showed marked healing with the wounds scabbed over and of much reduced size.

In a similar manner a calf weighing 200 pounds and badly infested with screw worms about one ear was treated with O-(2,4,5-trichlorophenyl) O,O-dimethyl phosphorothioate. The infestation was sufficient to have eroded away most of the ear. The treatment was carried out with an aqueous drench prepared from the concentrate composition of Example 5. The concentrate was employed in an amount sufficient to supply 50 milligrams of the phosphorothioate compound per kilogram of body weight of the calf. Two days following the treatment, the site of infestation was found to be free of screw worms and healing rapidly.

In each of the above described operations, no adverse effect upon the treated animal attributable to the phosphorus compounds was observed.

Example 13

A dog having a heavy population of fleas was treated with O-(2,4,5-trichlorophenyl) O-methyl phosphoroamidothioate at a dosage of 25 milligrams per kilogram of body weight. In the treating operations, a quantity of the concentrate composition as described in Example 12 sufficient to supply the required dosage was dispersed in a commercial canned dog ration and fed to the animal. After 24 hours the dog was examined and found to be completely free of fleas. No adverse effect upon the animal attributable to the treatment was observed.

Example 14

A dog infested with a heavy population of the dog louse was treated with O-(2,4,5-trichlorophenyl) O,O-dimethyl phosphorothioate at a dosage of 50 milligrams per kilogram of body weight. In the treating operations, a quantity of the concentrate composition as described in Example 5 was dispersed in a commercial canned dog ration in an amount sufficient to supply the desired dosage and fed to the animal. Examination of the dog after 24 hours and 48 hours showed a substantially complete control of lice.

In a similar manner, a dog weighing 15 pounds was fed O-(2,4,5-trichlorophenyl) O,O-dimethyl phosphorothioate at a daily dosage of 25 milligrams per kilogram of body weight for a period of four months. At the time of the initiation of the diet, the dog had a heavy infestation of fleas. Four days following the initiation of the diet, the dog was examined and found to be completely free of fleas. No adverse effect upon the dog attributable to phosphorothioate was observed.

Example 15

A portion of the concentrate composition containing O-(2,4,5-trichlorophenyl) O,O-dimethyl phosphorothioate as described in Example 1 was dispersed in a commercial poultry mash to prepare feed compositions containing 0.1 and 0.2 percent by weight of the phosphorothioate compounds. These compositions were fed as a sole ration for a period of 2.5 months to two flocks of chickens. Each flock consisted of ten adult chickens of the same history and past environment. The amount of the rations ingested by the flocks corresponded to dosages of 65 and 130 milligrams of the phosphorothioate compound per kilogram of body weight. A similar flock of chickens was fed unmodified mash to serve as checks. During the feeding period there was observed no adverse effect upon the chickens receiving the modified mash. Such treatment will control the blood sucking parasites of fowl such as fleas (*Ceratophyllus gallinae*), fowl ticks (*Argas pericus*) and mites (*Dermanyssus gallinae*).

Example 16

A portion of the concentrate composition as described in Example 5 was dispersed in water to prepare an aqueous composition containing 125 grams of O-(2,4,5-trichlorophenyl) O,O-dimethyl phosphorothioate per 10 ounces of water. This composition was employed for the control of cattle grubs in seven cows weighing about 950 pounds each and known to be infested with cattle grub. In such operations, the aqueous composition was orally administered to the cows at a dosage of 60 milligrams of the phosphorothioate compound per kilogram of body weight. A group of nine cows similarly infested with cattle grub were left untreated to serve as checks.

At intervals of 8, 10 and 14 weeks following treatment, the animals were examined for nodular dermal cysts harboring live cattle grub larvae. From the examination there was found only two cattle grubs in the seven treated cows. At the time of the observations, there was found an average of 8.2 grubs per cow in the nine untreated checks. Following the treatment, no adverse effect upon the cows attributable to the phosphorothioate compound was observed.

Example 17

O-(2,4,5-trichlorophenyl) O,O-dimethyl phosphorothioate was employed for the control of cattle grubs in a Brahman steer. At the time of treatment the steer had 25 nodular dermal cysts on his back containing live cattle grubs. In a number of the cysts, the grub had punctured the skin and prepared a hole for breathing purposes. In the treating operation, the animal was orally administered about 10 ounces of an aqueous composition containing the phosphorus compound to supply a dosage of 100 milligrams of O-(2,4,5-trichlorophenyl) O,O-dimethyl phosphorothioate per kilogram of body weight of the steer. The employed aqueous composition was prepared in the usual manner from a portion of the concentrate composition containing O-(2,4,5-trichlorophenyl) O,O-dimethyl phosphorothioate as described in Example 1. After 8 days the steer was examined for grub activity and for mortality of the grubs which had punctured the skin. From the examination it was found that all grub activity in the dermal cysts had ceased. Examination of the cysts having grub breathing holes showed that the grub contained therein was dead. Subsequent examinations showed that the treatment gave a 100 percent control of cattle grubs.

In a similar manner, two yearling calves having nodular dermal cysts on their backs containing live cattle grubs were treated with O-(2,4,5-trichlorophenyl) O,O-dimethyl phosphorothioate. The preparation of the aqueous compositions and the dosing operations were all carried out in the manner as described above with the phosphorus compound being administered to one calf at a dosage of 50 milligrams per kilogram of body weight and to the other calf at a dosage of 100 milligrams per kilogram of body weight. As a result of these operations there was obtained a complete control of all life stages of the cattle grub in the tested calves.

No adverse or deleterious effect upon the treated animals attributable to the phosphorothioate compound was observed in the above described operations.

*Example 18*

A portion of the concentrate composition containing O-(2,4,5-trichlorophenyl) O,O-dimethyl phosphorothioate as described in Example 1 is mechanically mixed and ground with a quantity of phenothiazine to produce an ingestible concentrate composition containing equal parts by weight of O-(2,4,5-trichlorophenyl) O,O-dimethyl phosphorothioate and phenothiazine.

In a further operation, a portion of the concentrate composition containing O-(2,4,5-trichlorophenyl) O,O-dimethyl phosphorothioate as described in Example 1 is mechanically mixed and ground with a quantity of phenothiazine to produce an ingestible concentrate composition containing 0.75 part by weight of O-(2,4,5-trichlorophenyl) O,O-dimethyl phosphorothioate and one part by weight of phenothiazine.

In a similar manner, an ingestible concentrate composition containing 0.3 part by weight of O-(2,4,5-trichlorophenyl) O,O-dimethyl phosphorothioate and one part by weight of phenothiazine is prepared from phenothiazine and the concentrate composition containing O-(2,4,5-trichlorophenyl) O,O-dimethyl phosphorothioate as described in Example 5.

These concentrate compositions are adapted to be dispersed in water or in animal feeds to produce compositions adapted to be administered to warm blooded animals to supply a chemotherapeutic dose of the combination of agents. When so employed, the compositions give greater than additive controls of many parasites attacking the animals.

The phosphoroamidothioates as employed in accordance with the present invention may be prepared by reacting one molecular proportion of a suitable O-aryl phosphorodichloridothioate with one molecular proportion of sodium methylate or sodium ethylate to produce an O-aryl O-methyl phosphorochloridothioate or O-aryl O-ethyl phosphorochloridothioate intermediate. In such operations, the alcoholate is added portionwise at a temperature of from 30° to 80° C. to the phosphorodichloridothioate reagent dispersed in a solvent such as benzene. The phosphoroamidothioates are then prepared by reacting gaseous ammonia, methyl amine or ethyl amine with the intermediate dispersed in a solvent such as benzene. This latter operation is carried out at a temperature of from 0° to 30° C. and in sufficient excess of ammonia or amine to act as hydrogen chloride acceptor.

The O-(halophenyl) O,O-dialkyl phosphorothioates as herein employed may be prepared by reacting two molecular proportions of sodium methylate or sodium ethylate with one molecular proportion of a suitable O-(chlorophenyl) phosphorodichloridothioate. In such operations the alcoholate is added at a temperature of from 30° to 80° C. to the phosphorodichloridothioate reagent dispersed in a solvent such as benzene. Following the reaction, the product is separated in conventional manner.

We claim:

1. A method for controlling parasites attacking warm blooded animals which comprises orally administering to the animal a chemotherapeutic dosage of a systemic agent selected from the group consisting of the O-aryl O-methyl phosphoroamidothioates, O-aryl O-ethyl phosphoroamidothioates, O-aryl O-methyl N-methyl phosphoroamidothioates, O-aryl O-ethyl N-methyl phosphoroamidothioates, O-aryl O-methyl N-ethyl phosphoroamidothioates, O-halophenyl O,O-dimethyl phosphorothioates and O-halophenyl O,O-diethyl phosphorothioates, wherein O-aryl represents a member of the group consisting of O-(4-methoxyphenyl), O-(4-lower-alkyl-2-chlorophenyl) and O-halophenyl, and halophenyl represents a member of the group consisting of O-(monochlorophenyl), O-(2,4-dichlorophenyl), O-(2,5-dichlorophenyl), O-(3,4-dichlorophenyl) and O-(2,4,5-trichlorophenyl).

2. A method claimed in claim 1 wherein the animal is caused to ingest a composition comprising the systemic agent in intimate admixture with an innocuous ingestible adjuvant.

3. A method claimed in claim 1 wherein the systemic agent is O-(2,4,5-trichlorophenyl) O,O-dimethyl phosphorothioate.

4. A method claimed in claim 1 wherein the systemic agent is O-(2,4,5-trichlorophenyl) O-methyl N-ethyl phosphoroamidothioate.

5. A method claimed in claim 1 wherein the systemic agent is O-(2,4,5-trichlorophenyl) O-methyl phosphoroamidothioate.

6. A method claimed in claim 1 wherein the systemic agent is O-(2,4,5-trichlorophenyl) O-methyl N-methyl phosphoroamidothioate.

7. A method claimed in claim 1 wherein the systemic agent is O-(4-methoxyphenyl) O-methyl phosphoroamidothioate.

8. A feed for warm blooded animals containing at least 0.01 percent by weight of a systemic agent selected from the group consisting of the O-aryl O-methyl phosphoroamidothioates, O-aryl O-ethyl phosphoroamidothioates, O-aryl O-methyl N-methyl phosphoroamidothioates, O-aryl O-ethyl N-methyl phosphoroamidothioates, O-aryl O-methyl N-ethyl phosphoroamidothioates, O-halophenyl O,O-dimethyl phosphoroamidothioates, O-halophenyl O,O-diethyl phosphoroamidothioates, wherein O-aryl represents a member of the group consisting of O-(4-methoxyphenyl), O-(4-lower-alkyl-2-chlorophenyl) and O-halophenyl, and O-halophenyl represents a member of the group consisting of O-(monochlorophenyl), O-(2,4-dichlorophenyl), O-(2,5-dichlorophenyl), O-(3,4-dichlorophenyl) and O-(2,4,5-trichlorophenyl).

9. An animal feed claimed in claim 8 wherein the systemic agent is O-(2,4,5-trichlorophenyl) O,O-dimethyl phosphorothioate.

10. An animal feed claimed in claim 8 wherein the systemic agent is O-(2,4,5-trichlorophenyl) O-methyl N-ethyl phosphoroamidothioate.

11. An animal feed claimed in claim 8 wherein the systemic agent is O-(2,4,5-trichlorophenyl) O-methyl phosphoroamidothioate.

12. An animal feed claimed in claim 8 wherein the systemic agent is O-(2,4,5-trichlorophenyl) O-methyl N-methyl phosphoroamidothioate.

13. An animal feed claimed in claim 8 wherein the systemic agent is O-(4-methoxyphenyl) O-methyl phosphoroamidothioate.

14. In the practice of animal husbandry, the step of causing a warm blooded animal to ingest a composition comprising from 0.1 to 1.0 parts by weight of a systemic agent in intimate admixture with one part by weight of phenothiazine, the composition being ingested in an amount sufficient to provide from 40 to 175 milligrams of the systemic agent per kilogram of body weight of the animal, and the systemic agent being selected from the group consisting of the O-aryl O-methyl phosphoroamidothioates, O-aryl O-ethyl phosphoroamidothiates, O-aryl O-methyl N-methyl phosphoroamidothioates, O-aryl O-ethyl N-methyl phosphoroamidothioates, O-aryl O-methyl N-ethyl phosphoroamidothioates, O-halophenyl O,O-dimethyl phosphorothioates and O-halophenyl O,O-diethyl phosphorothioates, wherein O-aryl represents O-(4-methoxyphenyl), O-(4-lower-alkyl-2-chlorophenyl) and O-halophenyl, and O-halophenyl represents O-(monochlorophenyl), O-(2,4-dichlorophenyl), O-(3,4-dichlorophenyl) and O-(2,4,5-trichlorophenyl).

15. A composition comprising from 0.1 to 1.0 part by weight of a systemic in intimate admixture with one part by weight of phenothiazine, the systemic agent being selected from the group consisting of the O-aryl O-methyl phosphoroamidothioates, O-aryl O-ethyl phosphoroamidothioates, O-aryl O-methyl N-methyl phosphoroamidothioates, O-aryl O-ethyl N-methyl phosphoroamidothioates, O-aryl O-methyl N-ethyl phosphoroamidothioates, O-halophenyl O,O-dimethyl phosphorothioates and O-halophenyl O,O-diethyl phosphorothioates, wherein O-aryl represents a member of the group consisting of O-(4-methoxyphenyl), O-(4-lower-alkyl-2-chlorophenyl) and O-halophenyl, and O-halophenyl represents a member of the group consisting of O-(monochlorophenyl), O-(2,4-dichlorophenyl), O-(2,5-dichlorophenyl), O-(3,4-dichlorophenyl) and O-(2,4,5-trichlorophenyl).

References Cited in the file of this patent

UNITED STATES PATENTS

| | | |
|---|---|---|
| 2,552,574 | Moyle | May 15, 1951 |
| 2,664,380 | Vierling | Dec. 29, 1953 |

OTHER REFERENCES

McGregor: J. Econ. Ent., vol. 47, No. 3, June 1954, pp. 465–467.